United States Patent
Buljore et al.

(10) Patent No.: US 7,254,184 B2
(45) Date of Patent: Aug. 7, 2007

(54) WIRELESS COMMUNICATION USING MULTI-TRANSMIT MULTI-RECEIVE ANTENNA ARRAYS

(75) Inventors: Soodesh Buljore, Gif-sur-Yvette (FR); Sandrine Vialle, Gif-sur-Yvette (FR); Nicholas Whinnett, Gif-sur-Yvette (FR)

(73) Assignee: Motorola, Inc., Schaumburg, IL (US)

( * ) Notice: Subject to any disclaimer, the term of this patent is extended or adjusted under 35 U.S.C. 154(b) by 376 days.

(21) Appl. No.: 10/509,766

(22) PCT Filed: Apr. 18, 2003

(86) PCT No.: PCT/EP03/04185

§ 371 (c)(1),
(2), (4) Date: Sep. 28, 2004

(87) PCT Pub. No.: WO03/094387

PCT Pub. Date: Nov. 13, 2003

(65) Prior Publication Data

US 2005/0085269 A1    Apr. 21, 2005

(30) Foreign Application Priority Data

Apr. 30, 2002   (EP)   .................... 02291092

(51) Int. Cl.
*H04L 27/00*   (2006.01)

(52) U.S. Cl. .............. 375/299; 375/295; 375/315; 455/562.1; 455/575.7; 455/101

(58) Field of Classification Search ............ None
See application file for complete search history.

(56) References Cited

U.S. PATENT DOCUMENTS

| | | | | |
|---|---|---|---|---|
| 5,590,205 | A * | 12/1996 | Popovich ............ | 381/71.11 |
| 6,353,638 | B1 * | 3/2002 | Hottinen et al. ......... | 375/260 |
| 6,377,631 | B1 * | 4/2002 | Raleigh .............. | 375/299 |
| 7,099,380 | B1 * | 8/2006 | Feng et al. .......... | 375/150 |

FOREIGN PATENT DOCUMENTS

| WO | WO 01/69814 A1 * | 3/2000 |
|---|---|---|
| WO | WO 00/36764 A | 6/2000 |
| WO | WO 01/69814 A | 9/2001 |

OTHER PUBLICATIONS

Ahmed, M., Pautler, J., Rohani, K.: "CDMA receiver performance for multiple-input multiple-output", IEEE 54th Vehicular Technology, Oct. 7-11, 2001, pp. 1309-1313.

* cited by examiner

*Primary Examiner*—David C. Payne
*Assistant Examiner*—Leon-Viet Q Nguyen

(57) ABSTRACT

A method of closed-loop multi-stream wireless communication between a transmitter (1) comprising a transmit antenna array of N transmit antenna elements and a receiver (3) comprising a receive antenna array (4) of M receive antenna elements, wherein a plurality of distinct data steams (x1 X2) are transmitted from the transmit antenna array to the receive antenna array and the data streams are weighted by respective complex weighting matrices before being applied to the transit antenna array. The distinct data steams are separated and estimated at the receiver. The distinct data streams (x1 xG) are applied to respective sub-groups (6,7) of the transmit antenna elements at least one of which comprises a plurality of the transmit antenna elements each of the sub-groups comprising at least Nd transmit antenna elements, where M is greater than or equal to (N/Nd). The complex weighting matrices (v1 to vn) are functions of the respective transmission channels (hij) of the data streams (x1, to xG) including the respective sub-groupes of transmit antenna elements. Nd is preferably greater than or equal to two. Each of the complex weighting matrices is calculated to be substantially equal to the eigenvector corresponding to the largest eigenvalue of the matrix H H, where H is the matrix of the equivalent channel including the respective sub-groups of transmit antenna elements (6,7) seen by the corresponding data stream HH is the Hermitian transform of the matrix H. The number of the transmit antenna elements in each of the sub-groups is preferably re-configurable during operation as a function of channel conditions.

5 Claims, 3 Drawing Sheets

WIRELESS COMMUNICATION USING MULTI-TRANSMIT MULTI-RECEIVE ANTENNA ARRAYS

FIELD OF THE INVENTION

This invention relates to wireless communication using multi-transmit multi-receive antenna arrays, that is to say where both the transmitting and the receiving station comprise an array of antenna elements. In cases where the antenna elements at a given station may be used both for transmission and for reception, references herein to a 'transmitter', a 'transmit antenna' a 'receiver' or a 'receive antenna' are to be construed as references to the function that they are exercising during that operation.

BACKGROUND OF THE INVENTION

Wireless communication systems are assuming ever-increasing importance for the transmission of data, which is to be understood in its largest sense as covering speech or other sounds and images, for example, as well as abstract digital signals.

Currently proposed standards for wireless communication systems include the 3GPP ($3^{rd}$ generation Partnership Project) and 3GPP2 standards, which use Code Division Multiple Access ('CDMA') and Frequency Division Duplex ('FDD') or Time Division Duplex ('TDD'), the HIPERLAN and HIPERLAN2 local area network standards of the European Telecommunications Standards Institute ('ETSI'), which use Time Division Duplex ('TDD') and the International Telecommunications Union ('ITU') IMT-2000 standards. The present invention is applicable to systems of these kinds and other wireless communication systems.

In order to improve the communication capacity of the systems while reducing the sensitivity of the systems to noise and interference and limiting the power of the transmissions, various techniques are used separately or in combination, including space-time diversity, where the same data is transmitted over different transmit and/or receive antenna elements, and frequency spreading, such as Orthogonal Frequency Division Multiplex ('OFDM') where the same data is spread over different channels distinguished by their sub-carrier frequency.

At the receiver, the detection of the symbols is performed utilising knowledge of the complex channel attenuation and phase shifts: the Channel State Information ('CSI'). The Channel State Information is obtained at the receiver by measuring the value of pilot signals transmitted together with the data from the transmitter. The knowledge of the channel enables the received signals to be processed jointly according to the Maximum Ratio Combining technique, in which the received signal is multiplied by the Hermitian transpose of the estimated channel transfer matrix.

Two broad ways of managing the transmit diversity have been categorised as 'closed loop' and 'open loop'. In closed loop signal transmission, information concerning the transmission channels is utilised at the transmitter to improve the communication. For example, the document Tdoc SMG2 UMTS-L1 318/98 presented to the ETSI UMTS Physical Layer Expert Group describes operation of a Transmit Adaptive Array (Tx AA) FDD scheme in which the dedicated channels are transmitted coherently with the same data and code at each transmit antenna, but with antenna-specific amplitude and phase weighting. The receiver uses pilots transmitted on the Common Channels to estimate separately the channels seen from each antenna. The receiver estimates the weights that should be applied at the transmitter to maximise the power received at the receiver, quantises the weights and feeds them back to the transmitter. The transmitter applies the respective quantised weights to the amplitudes and phases of the signals transmitted from each transmit antenna of the array. Alternatively, in TDD systems, the channel state information for weighting the signals applied to the downlink transmit antennas may be derived from the uplink signals, assuming that the channels are equivalent, without transmission of any specific channel or weighting information from the receiver to the transmitter.

Multi-Transmit-Multi-Receive ('MTMR') diversity schemes, where essentially the same signal is transmitted in space-time diversity over the different combinations of transmit and receive antenna elements, can provide significant gains in Signal-to-Noise Ratios ('SNR') and thus operate at low SNRs, enabling an increase in spectral efficiency via the use of high order modulations. Alternatively, in multi-stream wireless communication schemes, different signals can be transmitted between the transmit and receive antenna element arrays enabling high spectral efficiency. However, multi-stream schemes of this kind that have been proposed are viable only at high SNRs and require complex receivers (for a N-Transmit and M-Receive antenna configuration, M must be greater than or equal to N) in order to be able to extract the different transmitted signals at the receiver.

An example of an open-loop multi-stream single user scheme is the Bell Labs layered space-time ('BLAST') scheme described in an article by G. J. Foschini entitled "Layered Space-Time Architecture for Wireless Communication in a fading Environment When Using Multiple Antennas," Bell Laboratories Technical Journal, Vol. 1, No. 2, Autumn, 1996, pp. 41-59.

A closed-loop alternative to the above scheme in which channel knowledge is used at the transmitter for multi-stream transmission is described in an article by Mansoor Ahmed, Joseph Pautler and Kamyar Rohani entitled "CDMA Receiver Performance for Multiple-Input Multiple-Output Antenna Systems," Vehicular Technology Conference, Fall, Atlanta City, October 2001. A schematic diagram illustrating the principle of this communication system is shown in the accompanying FIG. 1.

Such schemes are limited by compromises between diversity gain and spectral efficiency and accordingly the range of operational SNRs is limited unless complexity is increased or high modulation constellations (for example greater than 64 QAM) are used. The present invention offers a substantial improvement in the compromise between diversity gain and spectral efficiency.

SUMMARY OF THE INVENTION

The present invention provides a method of, and apparatus for, wireless communication using multi-transmit multi-receive antenna arrays as described in the accompanying claims.

DETAILED DESCRIPTION OF THE PREFERRED EMBODIMENTS

Figure 1:
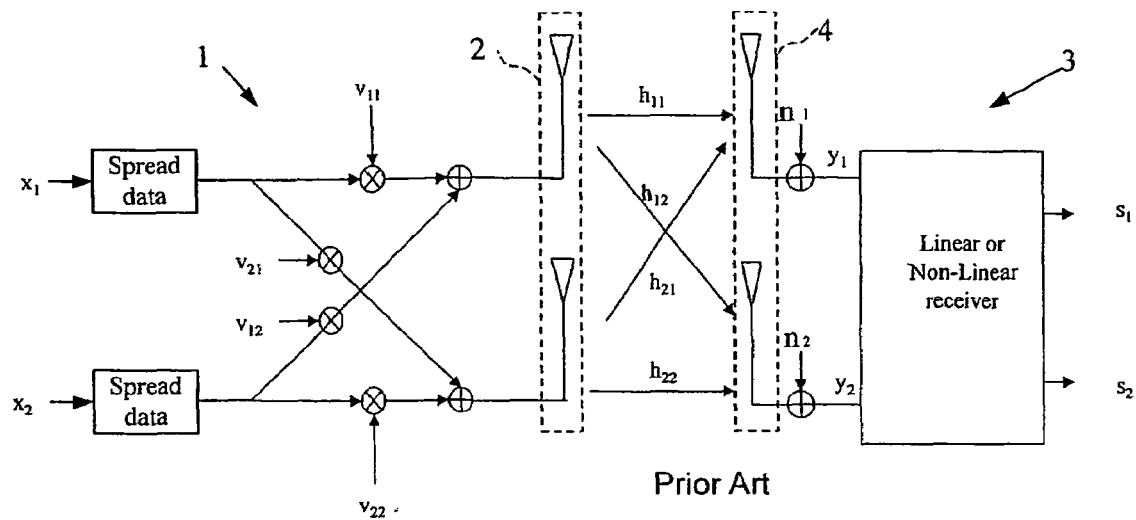
FIG. 1 is a schematic diagram of a known generic multi-stream single user communication system.

FIG. 1 of the drawings shows a known multi-stream wireless communication system comprising a transmitter station 1 comprising a transmit antenna array 2 of N transmit antenna elements and a receiver station 3 comprising a receive antenna array 4 of M receive antenna elements. In the example illustrated in FIG. 1, N=M=2. A plurality of distinct data streams $x_1$ to $X_F$ (F=two in the example of FIG. 1) are transmitted from the transmit antenna array 2 to the receive antenna array 4 and the data streams are weighted by respective complex weighting coefficients $v_{n,f}$ where n is the $n^{th}$ transmit antenna element and f is the $f^{th}$ data stream before being applied to the transmit antenna array. The distinct data streams are separated and estimated at the receiver station in a linear or non-linear receiver 5, to produce detected signals $s_1$ and $s_2$.

In the case shown in FIG. 1, with N=M=F=2, the propagation channel can be represented by a matrix $$\underline{H} = \begin{bmatrix} h_{11} & h_{12} \\ h_{21} & h_{22} \end{bmatrix}.$$

In the closed-loop system developed by Motorola and described in the article referred to above by Mansoor Ahmed, Joseph Pautler and Kamyar Rohani, channel knowledge is used at the transmitter for the multi-stream transmission. This scheme requires the knowledge of the weight matrix, V=[V1 V2], applied at the transmit antennas where $V1=[v_{1,1}\ v_{2,1}]^T$ and $V1=[v_{2,1}\ v_{2,2}]^T$ are two eigen-vectors of $H^H H$ (T and H stand for transpose and conjugate transpose respectively). The inputs $n_1$ and $n_2$ shown in FIG. 1 represent noise added to the signal channels. The noise is assumed in the analysis below to be independent, identically distributed ('i.i.d.') complex-valued Gaussian random values with variance $\sigma^2$ (AWGN noise). Finally $y_1$ and $y_2$ represent the respective received signals on the two antennas of the receive antenna array 2.

It will be appreciated that the BLAST technique described in the article referred to above by G. J. Foschini is equivalent to setting $v_{1,1}=v_{2,2}=1$ and $v_{1,2}=v_{2,1}=0$, that is to say that each data stream is transmitted only on a single respective transmit antenna element and no channel knowledge is used at the transmitter (open loop).

It will also be appreciated that, in a conventional TxAA closed loop transmit diversity scheme, a single stream is transmitted according to the eigenvector corresponding to the maximum eigenvalue of $H^H H$, so that $V1=[v_{1,1}\ v_{2,1}]^T$ and V2=0. This is a closed loop single stream single user scheme whereas in the dual-stream TxAA shown in FIG. 1 both eigenvectors V1 and V2 are used.

Analysis, in the context of High Speed Downlink Shared Channel (HS-DSCH) communication, has arrived at two main conclusions regarding the dual-Stream Tx AA. The first conclusion is that at low SNR (about −5 dB), with turbo codes, H-ARQ and water-filling the closed-loop dual-stream scheme can provide up to 50% increase in average throughput (Bits/Chip Interval) when compared to the open loop dual-stream scheme. The second conclusion is that for the closed-loop dual-stream scheme the performance (average throughput) of a non-linear receiver is nearly the same as that with a linear receiver, that is to say that the use of channel knowledge at the transmitter eliminates the need for non-linear processing.

However, it has been found that single stream closed loop transmit diversity (Tx AA) provides the best performance at mid and low SNR (−5 to 10 dB) and average throughput of 0.5 to 3 bits/chip-interval. This is very important, given that the high SNR scenario (>10 dB) conditions occur with low probability in cellular systems (especially CDMA systems, for example).

Figure 2:
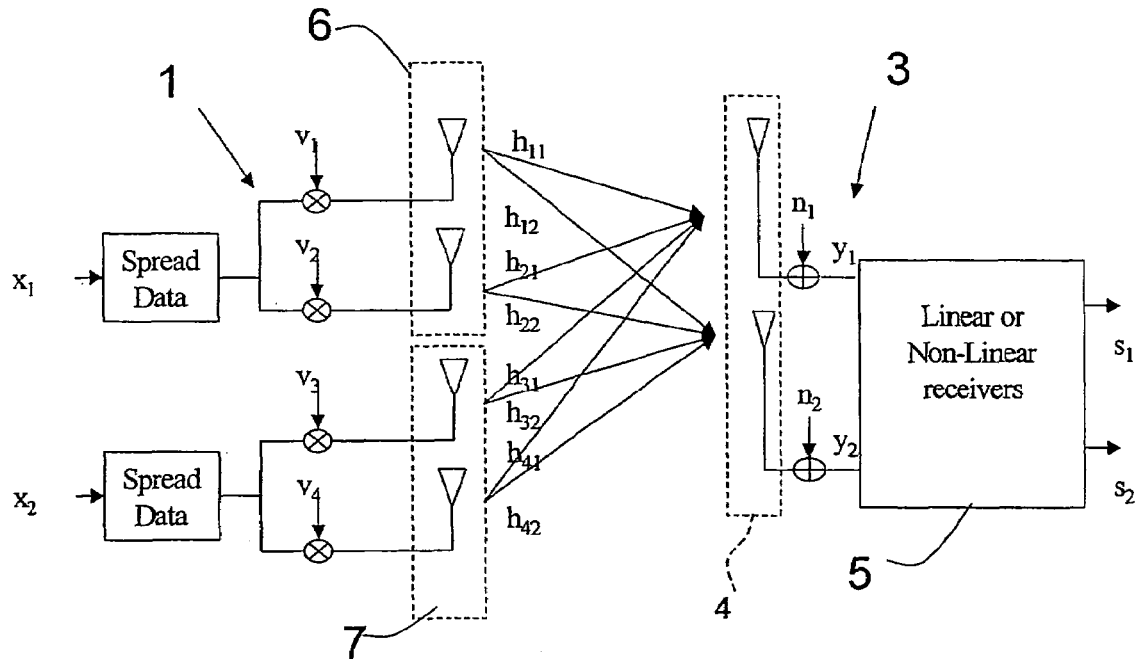
FIG. 2 is a schematic diagram of a multi-stream communication system in accordance with one embodiment of the invention, given by way of example.

The embodiment of the present invention shown in FIG. 2 takes advantage of closed loop transmit diversity while increasing the data rate by using multi-streaming. Similar elements in FIG. 2 to those of FIG. 1 have the same numbering.

This embodiment of the invention is applicable generally where F data streams are transmitted from respective sub-groups of the transmit antenna elements at least one of which comprises a plurality of the transmit antenna elements. In a preferred embodiment of the invention, each of the sub-groups of transmit antenna elements has the same number $N_d$ of transmit antenna elements. In another embodiment of the present invention, the sub-groups of transmit antenna elements have different numbers of transmit antenna elements, each of the sub-groups comprising at least $N_d$ transmit antenna elements. Preferably, as in this embodiment of the invention, the minimum number $N_d$ of transmit antenna elements in any sub-group is at least two. The use of more than one antenna element in a sub-group improves the diversity of the communication for that data stream, while the use of more than one sub-group improves the spectral efficiency by transmitting different signals via the sub-groups. The choice of the configuration, including the number of transmit antenna elements in each sub-group, and hence of N and $N_d$ is an optimisation problem which can be formulated in the context of a given application as a function of channel conditions and target performance, for example.

Depending on the target performance and functioning SNR, one can choose $N_d$, and the number of groups in order to provide the needed diversity and spectral efficiency. Moreover, one can also choose to set $N_d$ and the number of groups such that not all N antennas are used, economising on calculation complexity at the receiver. This configuration can be used in the case of good channel quality, thus high SNR and low target performance. In one embodiment of the present invention, the numbers of antennas used in total and in each sub-group and the value of $N_d$ are modified during operation of the system to adapt the choices to the current channel conditions and target performance.

On the receiver side, this embodiment of the invention is applicable generally to a number M of receive antennas, where M is greater than or equal to $(N/N_d)$.

For the sake of simplicity, the preferred embodiment of the invention is illustrated in FIG. 2 for the case of 2 data-streams, 4 transmit antennas and 2 receive antennas (N=4, $N_d$=2, M=2). The multi-stream wireless communication system shown in FIG. 2 comprises a transmitter station 1 comprising a transmit antenna array 2 of two transmit antenna elements and a receiver station 3 comprising a receive antenna array 4 of two receive antenna elements. A linear or non-linear receiver 5 separates, decodes and demodulates the signals received at the receive antenna array 4.

The elements of the transmit antenna array 2 are connected in two sub-groups 6 and 7. Two distinct data streams $x_1$ and $x_2$ are transmitted respectively from the transmit antenna sub-group 6 and from the transmit antenna sub-group 7 to the receive antenna array 4. The data stream $x_1$ is weighted by complex weighting coefficients $v_1$ and $v_1$ before being applied to the two antenna elements of the sub-group 6 respectively and the data stream $x_2$ is weighted by complex weighting coefficients $v_3$ and $v_4$ before being applied to the two antenna elements of the sub-group 7 respectively. The distinct data streams are separated and estimated at the receiver station in a linear or non-linear receiver 5, to produce detected signals $S_1$ and $S_2$.

In the case shown in FIG. 2, with $N=M=N_d=2$, the propagation channel can be represented by two matrices $$\begin{bmatrix} h_{11} & h_{12} \\ h_{21} & h_{22} \end{bmatrix} \text{ and } \begin{bmatrix} h_{31} & h_{41} \\ h_{32} & h_{42} \end{bmatrix},$$

where $h_{ij}$ represents the channel from the $i^{th}$ transmit antenna element to the $j^{th}$ receive antenna element.

The received signal vector can then be represented as follows:

$$\begin{bmatrix} y_1 \\ y_2 \end{bmatrix} = \begin{bmatrix} u_1 & u_2 \end{bmatrix} \begin{bmatrix} x_1 \\ x_2 \end{bmatrix} + \begin{bmatrix} n_1 \\ n_2 \end{bmatrix} \quad \text{Equation 1}$$

where $$u_1 = \begin{bmatrix} h_{11} & h_{21} \\ h_{12} & h_{22} \end{bmatrix}\begin{bmatrix} v_1 \\ v_2 \end{bmatrix} = \begin{bmatrix} h_{11}v_1 + h_{21}v_2 \\ h_{12}v_1 + h_{22}v_2 \end{bmatrix}, \quad \text{Equation 2}$$

$$u_2 = \begin{bmatrix} h_{31} & h_{41} \\ h_{32} & h_{42} \end{bmatrix}\begin{bmatrix} v_3 \\ v_4 \end{bmatrix} = \begin{bmatrix} h_{31}v_3 + h_{41}v_4 \\ h_{32}v_3 + h_{42}v_4 \end{bmatrix}$$

and where the data streams are weighted by respective complex weighting coefficients $v_{n,f}$, n being the $n^{th}$ transmit antenna element and f the $f^{th}$ data stream, $y_1$ and $y_2$ represent the respective received signals on the two antennas of the receive antenna array 2, and $n_1$ and $n_2$ represent noise added to the signal channels, again assumed to be independent, identically distributed ('i.i.d.') complex-valued Gaussian random values with variance $\sigma^2$ (AWGN noise).

Re-writing Equation (1) in a vector form, we obtain that:

$$Y = H_{equ}x + N \quad \text{Equation 3}$$

where $$H_{equ} = \begin{bmatrix} u_1 & u_2 \end{bmatrix} = \begin{bmatrix} h_{11}v_1 + h_{21}v_2 & h_{31}v_3 + h_{41}v_4 \\ h_{12}v_1 + h_{22}v_2 & h_{32}v_3 + h_{42}v_4 \end{bmatrix} \quad \text{Equation 4}$$

and the dimension of $H_{equ}$ is 2×2.

The estimated symbols (streams) at the output of a linear minimum mean square error (MMSE) receiver are given by:

$$s = GY = GH_{equ}x + GN \quad \text{Equation 5}$$

where $G = (H_{equ}{}^H H_{equ} + \sigma^2 I)^{-1} H_{equ}{}^H$ is the transfer function of the MMSE receiver, I is the identity matrix and the superscript H stands for the operation transpose conjugate.

For each stream the coefficients $V_1 = [v_1 \; v_2]^T$ and $V_2 = [v_3 \; v_4]^T$ are chosen in order to maximize the received power P under unit norm constraint so that the total transmit power is also normalized. The analytic solutions for $V_1$ and $V_2$, also called the eigenfilter solution (see for example chapters 4.4 and 4.5 of the book "Adaptive filter theory" by Simon Haykin, published by Prentice Hall) are the eigenvectors corresponding to the largest eigenvalues of the matrices $H_1{}^H H_1$ and $H_2{}^H H_2$, where $$H_1 = \begin{bmatrix} h_{11} & h_{21} \\ h_{12} & h_{22} \end{bmatrix} \text{ and } H_2 = \begin{bmatrix} h_{31} & h_{41} \\ h_{32} & h_{42} \end{bmatrix} \quad \text{Equation 6}$$

Using Equation (6), the two streams can be separated and estimated at the output of the receiver, thus an increase in spectral efficiency of order 2 is obtained. In addition, for coherent combining and diversity gain, the antenna coefficients $V_1$ and $V_2$ are chosen to maximize the receiver output power for each stream.

Figure 3:
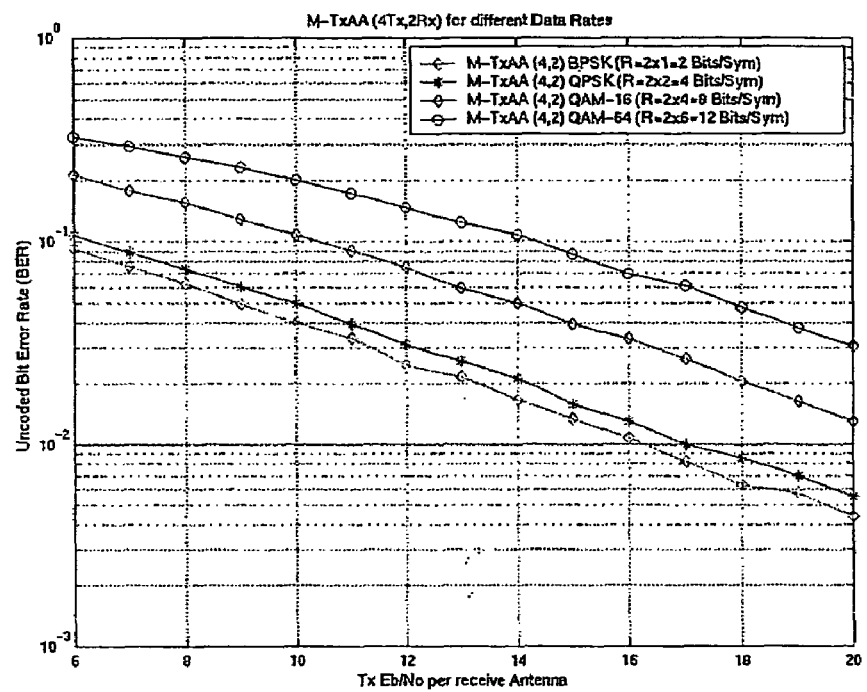
FIG. 3 is a graph illustrating the performance of the system of FIG. 2 for different spectral efficiencies.
Figure 4:
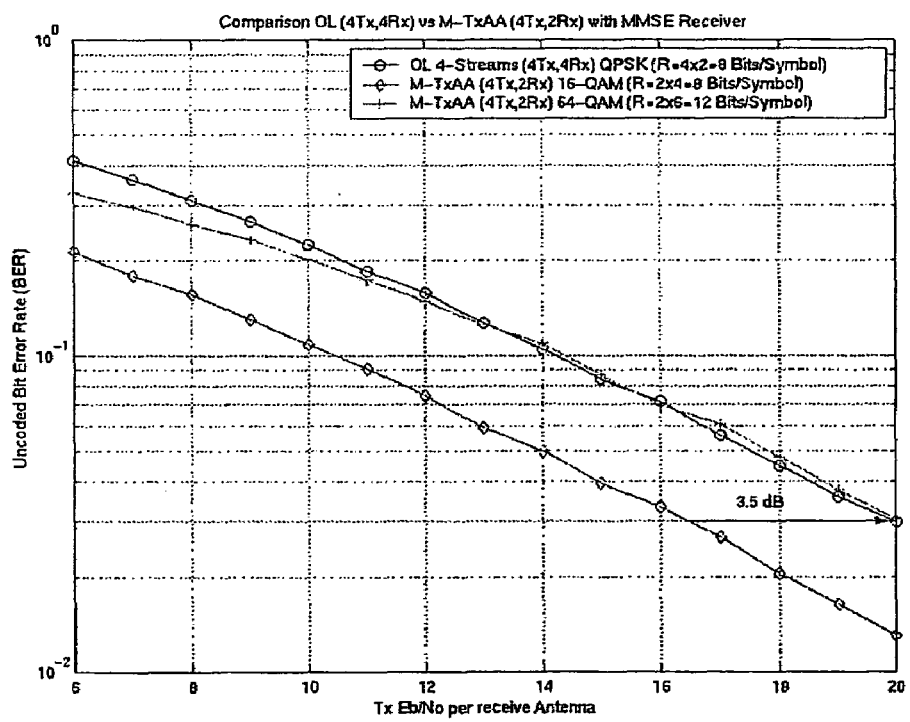
FIG. 4 is a graph illustrating the performance of the system of FIG. 2 compared with an open loop system with the same number of transmit antenna elements but different numbers pf receive antenna elements.
Figure 5:
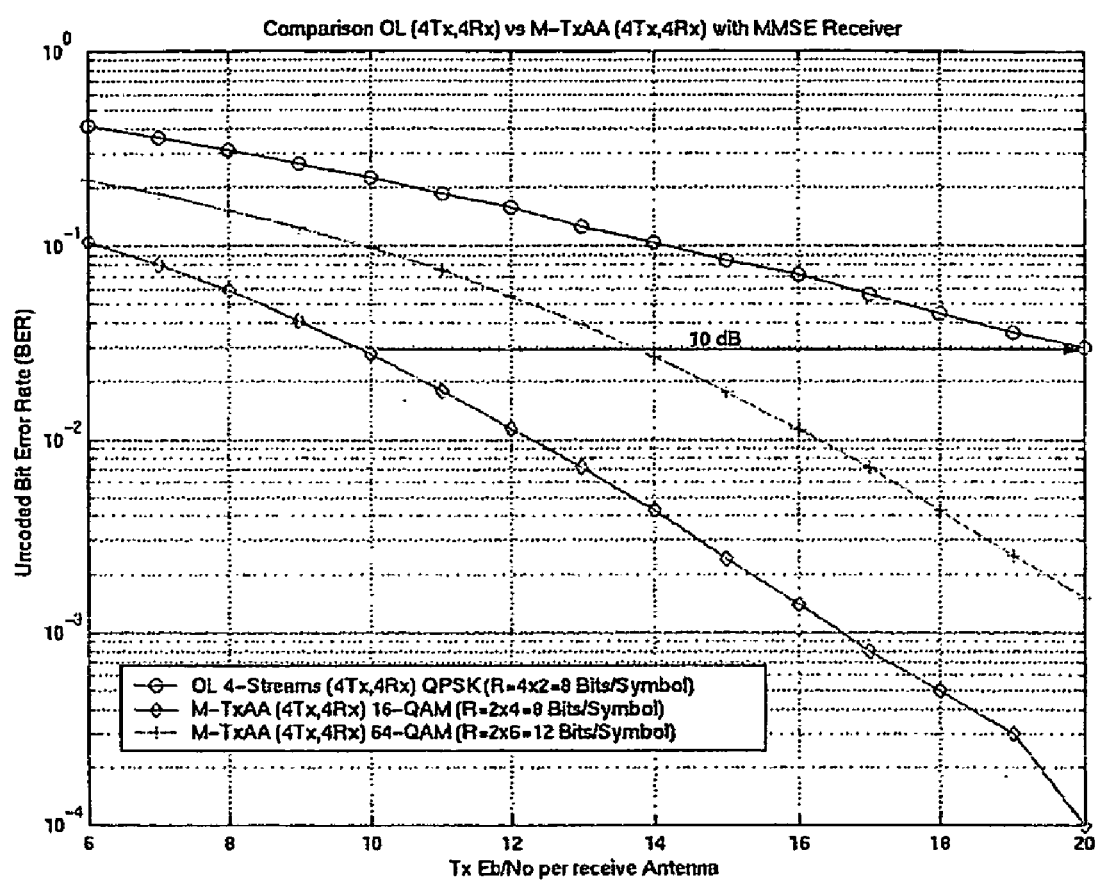
FIG. 5 is a graph illustrating the performance of the system of FIG. 2 compared with an open loop system with the same numbers of transmit and receive antenna elements.

The performance of this embodiment of the present invention, referred to as multi-stream transmit adaptive antenna ('M-TxAA') is shown in FIGS. 3, 4 and 5 for different values of N, $N_d$ and M and spectral efficiencies, for the case N=4, $N_d=2$ and M=2. The performance is evaluated in terms of un-coded bit error rate ('BER') as a function of the ratio of transmit energy per bit to noise ('Tx Eb/No').

The results obtained with this embodiment of the invention are shown in FIG. 3 for different spectral efficiencies, given by different coding schemes: binary phase shift key ('BPSK'), quadrature phase shift key ('QPSK'), and quadrature amplitude modulation with 16 and 64 symbols per constellation ('QAM-16' and 'QAM-64').

FIG. 4 shows a comparison between the performances of this embodiment of the present invention (M-TxAA) and an open loop system ('OL') with the same number of transmit antenna elements (four) and four receive antenna elements instead of this embodiment of the present invention's two receive antenna elements. It will be seen that for the given range of Tx Eb/No [6-20 dB], the performance is significantly improved when M-TxAA is used compared to the multi-stream open loop scheme (BLAST). Furthermore, for a given SNR and uncoded BER, (say $3e^{-2}$ and 20 dB) M-TxAA achieves a bit rate of 12 Bits/Symbol (R=2×6) which is 50% higher than the open loop multi-stream scheme. On the other hand, for a fixed bit rate and a given un-coded BER (e.g. 8 bits/symbol and 3e−2) M-TxAA can operate at a SNR of 16.5 dB which is 3.5 dB less than the open loop multi-stream scheme. Note that for these FIGS. 3 and 4, only M=2 antennas is used at the receiver for M-TxAA, thus resulting in a reduced mobile complexity, whereas the open loop multi-stream needs at least M=4 receive antennas.

FIG. 5 shows a comparison between the performances of this embodiment of the present invention (M-TxAA) and an open loop system ('OL') with the same number (four) of transmit antenna elements and of receive antenna elements. It will be seen that, for a given spectral efficiency, e.g. 8 bits/symbol, and a given uncoded BER, e.g. $3e^{-2}$, M-TxAA can operate at a SNR of 10.0 dB, which is 10 dB less than the open loop multi-stream scheme. Moreover, at the same un-coded BER of $3e^{-2}$, for a bit rate 50% higher than the open loop (12 bits/symbol rather than 8 bits/symbol), M-TxM still can operate at an SNR of 14 dB, i.e., 4 dB lower.

The quantisation of the weights $V_1=[v_1\ v_2]^T$ and $V_2=[v_3\ v_4]^T$ can be performed as specified in the current 3GPP Rel'99 Closed loop transmit diversity scheme. The elements $v_1$ and $v_3$ can be fixed to a constant power, and $v_2$ and $v_4$ are set to relative amplitude and phase (to $v_1$ and $v_3$ respectively). Thus only the two coefficients $v_2$ and $v_4$ need to be fed back which represents negligible additional overhead.

In the embodiments of the invention described above, the transmit antenna pairs (6) and (7) form part of a single transmitter, that is to say that they are in the same cell/sector. However it is also possible for them to form parts of two different sectors/cells with which the mobile is in simultaneous communication during soft-handover/softer-handover. Thus the mobile would receive, two separate streams from two different cells/sector base-station transmitters.

The embodiments of the invention have been described above with specific reference to the example where there are two transmit antenna sub-groups with two antenna elements in each sub-group and two receive antenna elements. The adaptation of the above equations to the more general case of G sub-groups of transmit antenna elements, the sub-group $G_i$ comprising $N_i$ transmit antenna elements where $N_i \geq N_d$, and M receive antenna elements gives the following equations (indicated for the flat-fading case, the extension to the more general multi-path case being obtained by putting corresponding vectors for the terms of the matrices):

Equation (1) becomes:

$$\begin{bmatrix} y_1 \\ \vdots \\ y_m \\ \vdots \\ y_M \end{bmatrix} = [u_1 \cdots u_g \cdots u_G] \begin{bmatrix} x_1 \\ \vdots \\ x_g \\ \vdots \\ x_G \end{bmatrix} + \begin{bmatrix} n_1 \\ \vdots \\ n_g \\ \vdots \\ n_G \end{bmatrix} \quad \text{Equation 7}$$

The values of $u_i$ become (Equation 2)

$$u_i = \begin{bmatrix} \underline{h}_{\sum_{1 \leq j < i} N_j+1,1} & \cdots & \underline{h}_{\sum_{1 \leq j < i} N_j+k,1} & \cdots & \underline{h}_{\sum_{1 \leq j \leq i} N_j,1} \\ \vdots & \cdots & \vdots & \cdots & \vdots \\ \underline{h}_{\sum_{1 \leq j < i} N_j+1,m} & \cdots & \underline{h}_{\sum_{1 \leq j < i} N_j+k,m} & \cdots & \underline{h}_{\sum_{1 \leq j \leq i} N_j,m} \\ \vdots & \cdots & \vdots & \cdots & \vdots \\ \underline{h}_{\sum_{1 \leq j < i} N_j+1,1} & \cdots & \underline{h}_{\sum_{1 \leq j < i} N_j+k,M} & \cdots & \underline{h}_{\sum_{1 \leq j \leq i} N_j,M} \end{bmatrix} \begin{bmatrix} \underline{v}_{\sum_{1 \leq j < i} N_j+1} \\ \vdots \\ \underline{v}_{\sum_{1 \leq j < i} N_j+2} \\ \vdots \\ \underline{v}_{\sum_{1 \leq j < i} N_j} \end{bmatrix}$$

Equation 8 with i=1, . . . , G, note that the sum is for the first index only, that is if we represent $h_{index1,index2}$, then index 1 is a sum as expressed above.

Equation 4 becomes:

$$H_{equ} = [u_1 \cdots u_g \cdots u_G] = \begin{bmatrix} H_{equ}(a,b) \\ a = 1 \cdots M \\ b = 1 \cdots G \end{bmatrix} \quad \text{Equation 9}$$

with $$H_{equ}(a,b) = \sum_{l=1}^{v_b} \underline{h}_{\sum_{1 \leq j < a} N_{j+l}, a \sum_{1 \leq j < i} N_j + l} \quad \text{Equation 10}$$

The eigenfilter solution for $V_i$ (c.f. Equation 6) is then the eigenvector corresponding to the largest eigenvalue of the matrix $H_i^H H_i$ where:

$$H_i = \begin{bmatrix} \underline{h}_{\sum_{1 \leq j < i} N_j+1,1} & \cdots & \underline{h}_{\sum_{1 \leq j < i} N_j+k,1} & \cdots & \underline{h}_{\sum_{1 \leq j \leq i} N_j,1} \\ \vdots & \cdots & \vdots & \cdots & \vdots \\ \underline{h}_{\sum_{1 \leq j < i} N_j+1,m} & \cdots & \underline{h}_{\sum_{1 \leq j < i} N_j+k,m} & \cdots & \underline{h}_{\sum_{1 \leq j \leq i} N_j,m} \\ \vdots & \cdots & \vdots & \cdots & \vdots \\ \underline{h}_{\sum_{1 \leq j < i} N_j+1,1} & \cdots & \underline{h}_{\sum_{1 \leq j < i} N_j+k,M} & \cdots & \underline{h}_{\sum_{1 \leq j \leq i} N_j,M} \end{bmatrix} \quad \text{Equation 11}$$

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A method of closed-loop multi-stream wireless communication between transmitter means comprising a transmit antenna array of a plurality of N transmit antenna elements and receiver means comprising a receive antenna array of a plurality of M receive antenna elements, wherein a plurality of distinct data streams ($x_1$, $x_2$) are transmitted from said transmit antenna array to said receive antenna array and said data streams are weighted by respective complex weighting matrices before being applied to said transmit antenna array, said distinct data streams being separated and estimated at said receiver means, the method comprising:

applying said distinct data streams ($x_1$, $x_G$) to respective sub-groups of said transmit antenna elements at least one of which comprises a plurality of said transmit antenna elements, each of said sub-groups comprising at least $N_d$ transmit antenna elements, where M is greater than or equal to ($N/N_d$), said complex weighting matrices ($v_1$ to $v_n$) being functions of the respective transmission channels ($h_{ij}$) of said data streams ($x_1$, to $x_G$) between each of the plurality of N transmit antenna elements and each of the plurality of M receive antenna elements including the respective sub-groups of transmit antenna elements.

2. A method as claimed in claim 1, wherein $N_d$ is greater than or equal to two.

3. A method as claimed in claim 1, wherein each of said complex weighting matrices is calculated to be substantially equal to the eigenvector corresponding to the largest eigenvalue of the matrix $H^H H$, where H is the matrix of the equivalent channel including the respective sub-groups of transmit antenna elements seen by the corresponding data stream and $H^H$ is the Hermitian transform of the matrix H.

4. A method as claimed in claim 1, wherein the number of said transmit antenna elements in each of said sub-groups is re-configurable during operation.

5. An apparatus for closed-loop multi-stream wireless communication between transmitter means having a transmit antenna array of a plurality of N transmit antenna elements, and receiver means having a receive antenna array of a plurality of M receive antenna elements, wherein:

the transmitter means is operable to transmit a plurality of distinct data streams ($x_1$, $x_G$) from said transmit antenna array to said receive antenna array and to weight said data streams by respective complex weighting matrices before being applied to said transmit antenna array, the receiver means is operable to separate and estimate said distinct data streams, and the transmitter means further comprises means for applying said distinct data streams ($x_1$, $x_G$) to respective sub-groups of said transmit antenna elements at least one of which comprises a plurality of said transmit antenna elements, each of said sub-groups comprising at least $N_d$ transmit antenna elements, where M is greater than or equal to ($N/N_d$), said complex weighting matrices ($v_1$ to $V_n$) being functions of the respective transmission channels ($h_{ij}$) of said data streams ($x_1$, to $x_G$) between each of the plurality of N transmit antenna elements and each of the plurality of M receive antenna elements including the respective sub-groups of transmit antenna elements.

* * * * *